United States Patent Office 3,827,945
Patented Aug. 6, 1974

3,827,945
DISTILLATION APPARATUS
James D. Wixson, 902 Marine St., Boulder, Colo. 80302
Original application Aug. 6, 1969, Ser. No. 850,325, now Patent No. 3,637,465. Divided and this application Jan. 24, 1972, Ser. No. 220,391
Int. Cl. B01d 3/00, 3/08, 3/28
U.S. Cl. 202—177                8 Claims

ABSTRACT OF THE DISCLOSURE

The invention relates to purification of liquids by distillation. Processes of this nature have long been known. One well known example is the conversion of sea water to fresh water by distillation. The purpose of the invention is to accomplish the distillation with maximum efficiency. As is well known, in distilling a liquid the impure liquid is heated so as to vaporize the portion of the liquid sought to be recovered, thereby separating the material to be recovered from the material to be rejected by virtue of the fact that they exist in different phases. Having separated the components by phase the vapor is then transferred to another region where its temperature is lowered so that it condenses in a region separate from the impure mixture and thus is recovered.

---

This is a division of application, Ser. No. 850,325 filed Aug. 6, 1969, now Pat. 3,637,465.

This invention relates to a distillation method and apparatus, more particularly to a method and apparatus for distilling a liquid under conditions which are near theoretically optimum heat recovery.

A typical object of such distillation process is to make potable water from sea water or water otherwise contaminated with impurities. High operating costs have evolved in most prior art processes which have a sufficiently high output rate to be commercially interesting, primarily because of high energy consumption.

It is a primary object of this invention to provide a distillation system which reduces the energy necessary to produce a unit mass of distilled liquid to an amount which is near the theoretical minimum.

A further object of this invention is to provide a distillation system of either large or small scale, which yields a cheap, pure condensate.

It is another object to provide a distillation system in which heat flows from the fluid being cooled to the fluid being heated in a manner which is essentially recirculating counterflow exchange. This specifically includes (1) counterflow heat exchange between the raw liquid entering the system on one hand and the condensate and concentrate leaving the system on the other; (2) recovery of heat of condensation from the condenser and reintroduction of this heat into the evaporator; (3) counterflow heat exchange from the cooling superheated gas or steam to that vapor which has just evaporated and is being superheated to remove entrained impurities.

These and other objects of the invention for obtaining the highest possible quantity of liquid recovered from its solution per energy cost at a high mass rate of flow will become more apparent upon further reading of the specification and claims, taken in conjunction with the following illustrations, of which:

Figure 1:
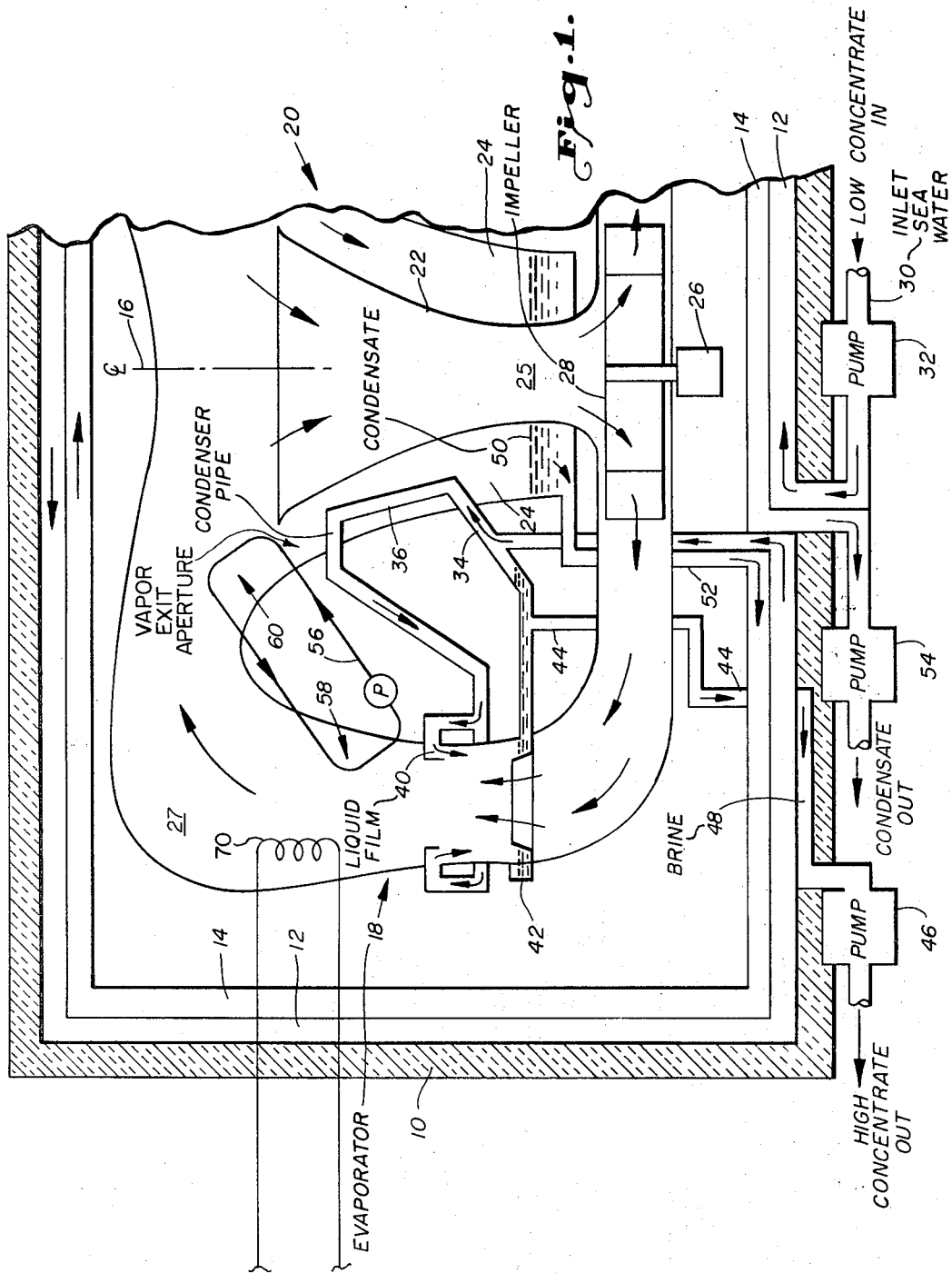
FIG. 1 is a diagrammatic illustration and flow diagram of the method and an apparatus incorporating the basic concepts of this invention.

The apparatuses of all the figures generally include an insulated housing 10 in which the internal walls consist of many layers of concentrically arranged heat exchanger surfaces. Diagrammatically, this is shown as spaces 12 and 14 which are in heat transfer relationship with each other. Interior thereto is an interconnected evaporator and condenser. The evaporator is generally designated by the numeral 18 while the condenser is generally designated by the numeral 20. The evaporator in the embodiment of FIG. 1 is designed to provide for diverging flow and the condensing section 20 provides for converging flow of the recirculating vapor. The latter includes a converging nozzle portion 22 and a condensation or stagnation chamber 24 which surrounds the converging nozzle portion and is in heat transfer relationship therewith. The diagram shows only one nozzle; in actual construction a multiplicity of converging nozzles may be surrounded by the stagnation chamber 24. A motor 26 is adapted to drive an impeller 28 for the continuous circulation of vapor between the evaporator and condenser, as shown by the arrows. Other apparatus includes inlet 30 and pump 32 which connect with heat exchanger wall 12. Flow continues interiorly into conduit 34. This conduit is a part of a circuit by means of which the raw solution at boiling temperature is recirculated through the evaporator, perhaps flowing along its walls as shown at 40, optionally countercurrent to the vapors passing through the diverging nozzle as shown by the arrows. This liquid flow may in some instances be a falling film of boiling liquid, the unevaporated portion of which drops into receiving tray 42 and is recirculated. Some of this highly concentrated liquid is thereafter removed through conduit 44 at a rate dependent upon the desired concentration of the recirculating liquid. This concentrate leaves through pump 46. It will normally be desirable to utilize the heat of said concentrate by a heat transfer, diagrammatically shown at 48, whereby its heat is transferred to and increases that temperature of the incoming raw solution in zone 12.

Condensate designated by the numeral 50 is removed from the stagnation chamber 24, passing through conduit 52 and thence into the second annular zone 14, to finally exit through pump 54.

For the purpose of illustration, if a pressure greater than atmospheric exists, pumps 46 and 54 are hydraulic motors to recover the work of pump 32. If the evaporator pressure is less than atmospheric, then 46 and 54 become pumps and 32 is a hydraulic motor.

Typical operation is described with reference to producing potable water from sea water. This involved pumping the sea water from inlet 30 by pump 32 into zone 12, which is in heat transfer relationship with zone 14. This zone 14 contains condensate which yields up its heat as it flows toward pump 54. Heatflow through the heat exchanger wall, typified by zones 12 and 14 within the insulated housing 10, has raised the temperature of the sea water to nearly its boiling temperature at the point where it enters conduit 34. Additional heat is added each time it passes through conduit 36, located in the higher temperature stagnation zone 24, thereupon the nearly boiling liquid flows through inlet 40, there falling countercurrent to the vapors within the diverging zone. Unevaporated concentrate collects in tray 42, a portion of it is thereafter removed from the system in a predetermined mass ratio to the entering liquid, through conduit 44 and heat exchanger 48, by means of pump 46. In the evaporator 18 the recirculating vapor slows; its temperature rises to slightly above the boiling temperature of the recirculating liquid 40. Thus heat is transferred from the recirculating vapor to the recirculating liquid. This vapor together with the newly generated vapor passes to the widest point of the diverging chamber. At this point, indicated by the numeral 27, flow is quite slow and a substantial degree of superheat may be achieved. If desired a recirculating counterflow heat exchanger 56, 58, 60 may assist in such superheating, drawing heat from the steam approaching the condenser 20 and transporting it to the steam leaving the evaporator 18. The flow then continues into the condenser. Here a portion of the vapor is diverted into the stagnation zone 24 and yields up its heat of condensation to exchanger 36 and nozzle 22, resulting in condensate or potable water 50 which is thereafter removed from the system. This condensate passes through conduit 52 into zone 14 where it is in heat exchange with the incoming raw liquid in zone 12. The remaining portion of the vapor continues its circulation into the converging nozzle portion 22 of the condensing chamber where its velocity increases substantially and its temperature decreases to somewhat below the condensation temperature of the stagnant vapor. The nozzle or nozzles represented by the numeral 22 conduit heat from stagnation zone 24 into this recirculating steam. Thus, the heat of evaporation is removed from the vapor in stagnation zone 24 and the steam in zone 24 condenses and collects at 50. Vapor in conduit 25, 27 is maintained in circulation by impeller 28. As it leaves the throat 25 of nozzle 22 the conduit widens and the vapor slows down, increasing in temperature to somewhat above that of the recirculating liquid in section 40 of the evaporator. Thus, the heat of condensation acquired in nozzle 22 is returned as heat of evaporation to evaporator 18. The vapor flow path is to be everywhere designed for minimum flow drag. The evaporator and the condenser are thus connected by an aerodynamically efficient, continuous, closed conduit or path wherein vapor remains in constant flow. Temperature conditions within the system may be initially established by means of, for example, a heating coil 70, which also continuously provides the additional heat necessary to replace any losses. The provision for a small cross-sectional area in the converging nozzle 22 of the condenser and a large cross-sectional area in the evaporator 18 insures that the vapor temperature in nozzle 22 will be slightly less than condensation temperature and in the stagnation zone, and that the vapor temperature in the large cross section 27 is slightly greater than evaporation temperature in the evaporator 18. Flow through the converging nozzle causes acceleration, decreased pressure and temperature of the vapor within it, and causes absorption of heat from chamber 24 through the conducting nozzle walls. In throat 25 the vapor is at its highest velocity and lowest temperature. The provision for a stagnation zone in which the converging nozzle is surrounded with vapor permits the heat of condensation to be conducted from the stagnant zone through the conduit walls of the nozzle 22 to the vapor inside the nozzle and transported therewith to the evaporator, where it passes into the incoming solution. Here this heat causes some of said solution to evaporate, and the resultant vapor joins that already within the evaporator conduit. A counterflow heat exchange system 56 is diagrammatically shown in FIG. 1 as a means by which the vapor leaving the evaporator 18 may be superheated in zone 58 and this superheat subsequently removed in zone 60.

Figure 2:
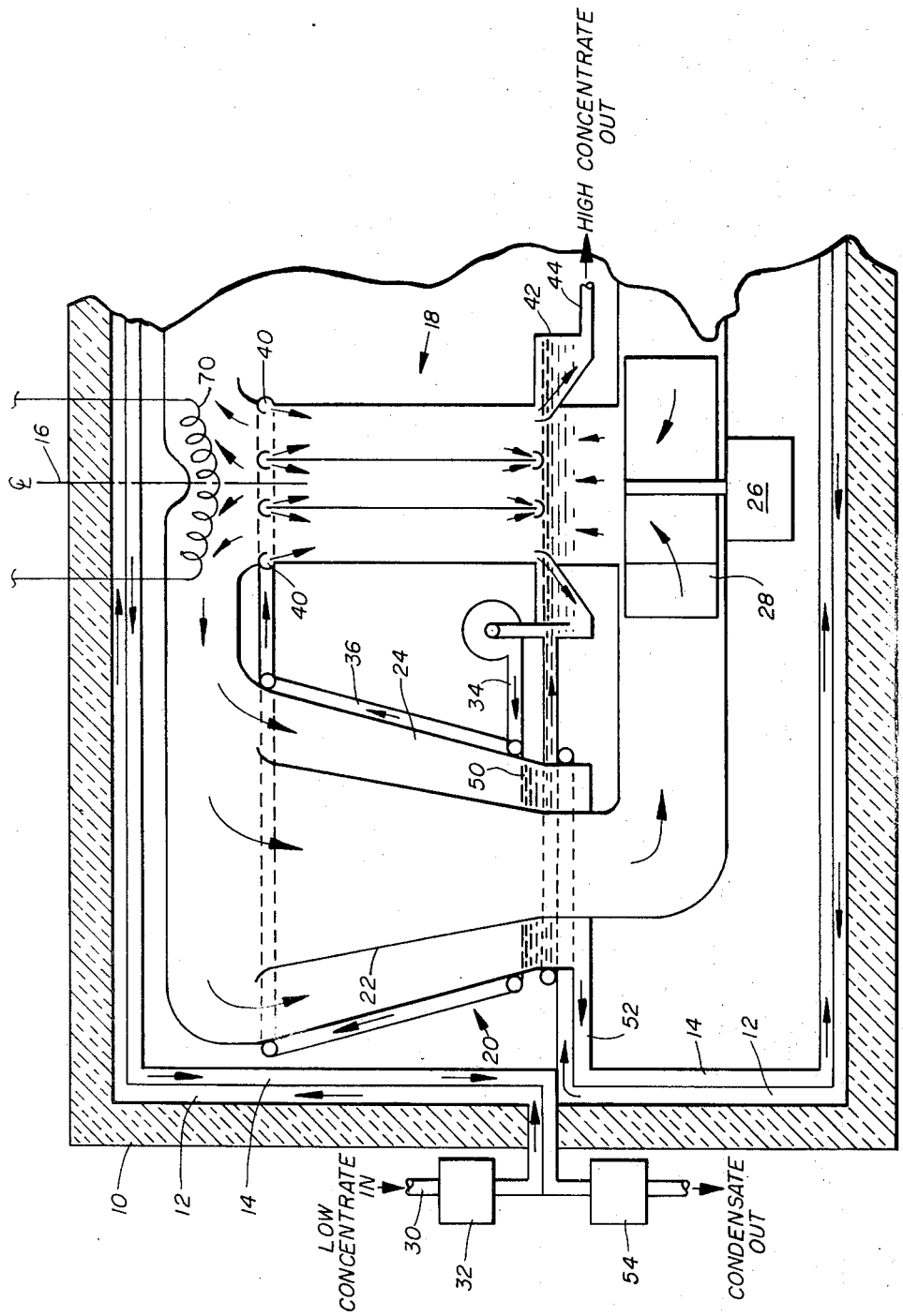
FIG. 2 is a diagrammatic illustration representing an alternate embodiment of the apparatus of FIG. 1.

The alternate embodiment illustrated in FIG. 2 encompass the general aspects of this invention as described in FIG. 1 with like numerals being given to the same or functionally related parts. In this particular instance, however, the vapor flow direction is opposite to that shown in FIG. 1 and the evaporator in this instance is a cylindrical type, although it is to be understood that a diverging nozzle effect may also be embodied in this design similar to that shown in FIG. 1. All other aspects of that other embodiment remain the same.

Figure 3:
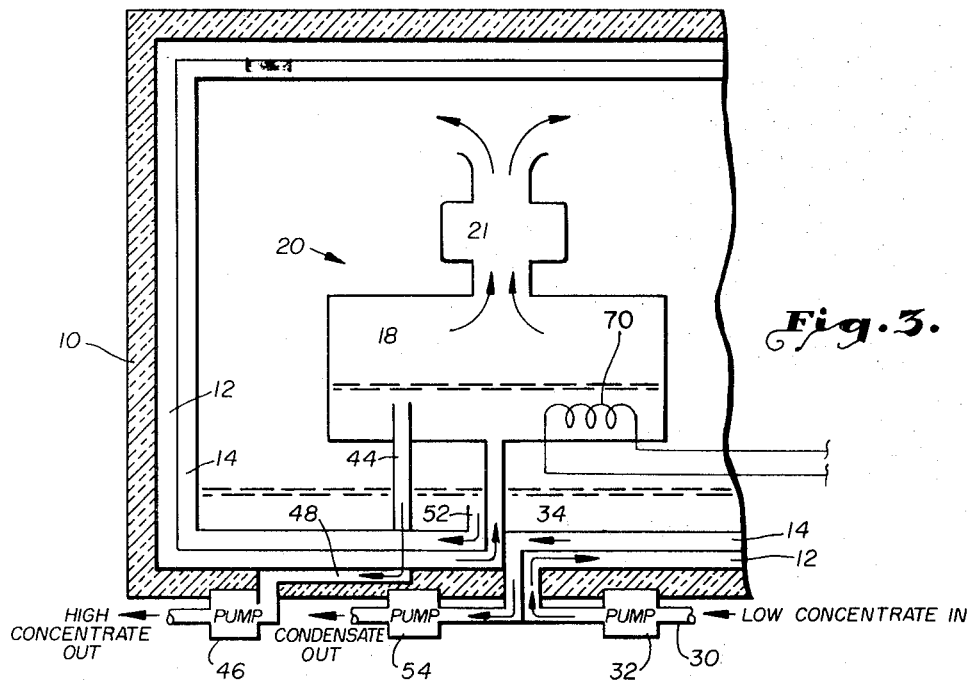
FIGS. 3 and 4 are diagrammatic illustrations of the basic principles of this invention according to alternative methods for accomplishing the invention.
Figure 4:
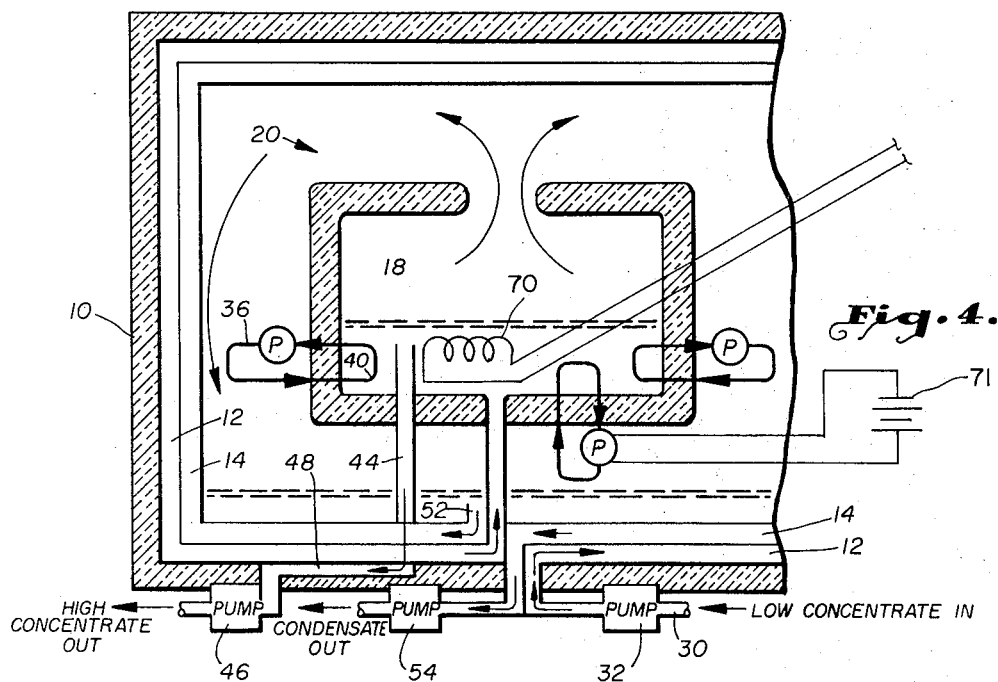

Alternative embodiments illustrated in FIGS. 3 and 4 encompass the general aspects of this invention as described in FIG. 1 with like numerals being given to the same or functionally related parts, with exceptions to be described. Basic to all embodiments is the surrounding annular heat exchanger. The embodiments of FIGS. 3 and 4, however, replace the recirculating vapor evaporator and condenser arrangement of FIGS. 1 and 2, but may retain the superheat arrangement of these latter figures.

In FIG. 3, raw liquid at substantially boiling temperature is fed into the evaporator 18, which is centrally located in the apparatus and is surrounded by the condenser 20. This evaporator has heat conducting walls of surface area sufficient to the desired heat transfer and is connected to a compressor 21 which operates either in steady or intermittent flow.

This compressor causes a pressure increase of the vapor flowing into the condenser 20 so that the temperature in the latter is increased sufficiently to allow the desired rate of heat transfer from the condenser through the walls of and into the evaporator 18. Thus, heat of condensation is removed from the vapor in condenser 20 and is simultaneously added to the liquid in evaporator 18, where it supplies the heat of evaporation to a quantity of liquid equivalent to the quantity of vapor condensing.

An intent of this process is that the temperature and pressure differential be held low enough that the heat transfer occurs nearly isothermally.

A certain proportion of the liquid in the evaporator must be removed, again in counterflow heat transfer, with the incoming raw liquid, in order to prevent an excessive accumulation of solute in the evaporator.

Heat losses may be made up by having a heat source, such as a heating coil 70, which is connected to an external source, and located in the evaporator. A system of check and float valves will prevent reverse flow and maintain the proper liquid levels in evaporator 18 and condenser 20.

In FIG. 4 raw liquid at substantially boiling temperature is fed into the evaporator 18 which is centrally located in the apparatus and is surrounded by the condenser 20. This evaporator has insulated walls through which at least one heat pump with its circulating system penetrates. The heat pump shown by the reference letter P in FIG. 4, with its system removes heat from the vapor in the condenser 20 through that portion 36 of its conduit which is in heat exchange with the vapor in condenser 20. The recirculating medium bearing this heat is then raised in temperature, by means of externally supplied energy as at 71, sufficient to cause flow of this heat to the raw liquid in the evaporator. Heat then flows from that portion 40 of the heat exchange conduit which is in heat exchange with the raw liquid in evaporator 18. Again, exchanger surface areas are to be everywhere sufficiently large to keep temperature differentials between heated and heating media to the lowest practical amount, consistent with desired rate of heat transfer, so that the heat transfer between the condenser and the evaporator approaches isothermal. As the raw liquid evaporates, it leaves the evaporator, which communicates by means of an opening with the condenser, and vapor flows into the surrounding evaporator. In this case, the evaporator and the condenser are at the same pressure.

Again, a certain proportion of the liquid in the evaporator must be removed as concentrate and its heat yielded to the inflowing raw liquid. Heat losses are made up as needed by supplying external heat as at 70, and a system of check and float valves are provided to prevent reverse flow and maintain proper liquid levels.

Theoretically this invention approaches the effect and purposes of using counterflow heat transfer to bring a raw solution to its boiling temperature and to recover this heat from the leaving liquids. Further, the heat of evaporation is supplied by recovering the heat of condensation from a given weight of vapor, raising the temperature of the medium bearing this heat by the alternative means discussed, and returning this heat to the raw solution, which has previously been raised to near boiling temperature. If any and all heat losses are made up from external sources, the heat of evaporation is supplied to essentially an equal weight of raw solution, which converts the latter to steam. Essential to the operation of this invention is the maintenance of desired temperature differentials at all heat transfer locations.

Entropy losses are minimized by everywhere transferring heat between media which are close in temperature to one another. Other energy losses are substantially eliminated by recovering the pump work and by providing that the leaving liquids be at substantially the temperature of the entering liquid.

Aslo essential is that the temperature of the outside wall of the apparatus be very close to ambient. This is provided for by insulation 10 and by having the outermost passageway of the heat exchanger wall 12 be filled with raw liquid at substantially ambient temperature.

Wherever this method has been described with respect to de-salting sea water, it is should be understood that the method is nevertheless applicable to any distillation process involving any liquids and that such are to be considered within the scope of the appended claims.

As used herein and in the claims, the following terms are defined:

Raw Liquid: that undistilled liquid whose solute is to be removed.

Concentrate: that liquid removed undistilled from the evaporator whose concentration of solute is significantly higher than that of the raw liquid.

Condensate: that pure distilled liquid which results from condensation of the vapors generated by evaporating the raw liquid.

I claim:

1. Apparatus for purifying a liquid by distillation comprising, in combination: an interconnected evaporator and condenser having walls which constitute the boundary of a cyclic path everywhere designed for minimum flow drag, said path having an enlarged portion whose flow area has relatively large cross-section and also having a constricted portion whose flow area has relatively small cross-section, a stagnation chamber, said walls having at least one vapor-exit aperture opening into said stagnation chamber which thus forms a receptacle connected to said cyclic path and so oriented as to receive a portion of the vapor flow, said chamber being in indirect contact with said constricted portion of the cyclic path by virtue of said chamber and said constricted portion being separated by the walls of said constricted portion, said walls being constructed of heat conducting material at the places where said walls are a boundary between said stagnation chamber and said constricted portion of the cyclic path, said vapor-exit aperture being at a portion of said path which is neither at its enlarged portion nor at its constricted portion, but at a portion intermediate to these, whereby in operation a portion of the vapor flowing from said enlarged portion is diverted through said vapor-exit aperture into said stagnation chamber, there to condense, said walls having at least one liquid-entrance aperture immediately upstream of said enlarged portion with regard to vapor flow for introducing liquid to be evaporated into said path in countercurrent film flow, means to remove concentrated liquid, and means for imparting directed flow to said vapor along said path by mechanical movement of an impeller, whereby said vapor is maintained in aerodynamically efficient flow, said constricted portion increasing the velocity and reducing the pressure and temperature of said vapor in said constricted portion to below that in said stagnation chamber so as to condense the vapor in said stagnation chamber, means to remove condensate therefrom and heating means adapted initially to establish temperature conditions within the system and continuously to provide the additional heat necessary to replace any losses.

2. Apparatus according to claim 1 wherein said path comprises a closed, endless, cyclic vapor flow circuit whereby vapor is maintained in aerodynamically efficient flow; wherein said constricted portion comprises a nozzle or nozzles to provide converging flow, said nozzle or nozzles having heat-conductive walls; wherein said enlarged portion provides diverging flow, whereby the temperature in the vicinity of said enlarged portion increases and said liquid in the vicinity of said enlarged portion vaporizes, which vapors join said recirculating vapor; and wherein said condensation region includes said stagnation chamber which surrounds said nozzles or nozzles so that said portion of the circulating vapor which has been diverted into said chamber is cooled by heat conduction therefrom through said nozzle walls and condenses.

3. Apparatus for purifying a liquid by distillation comprising in combination a first enclosure, a second, thermally insulated enclosure within said first enclosure, means to introduce liquid to be evaporated into said thermally insulated enclosure, means for maintaining the interior of both enclosures near the boiling point of said liquid, and heat pump type means for conveying heat into said thermally insulated enclosure from said first enclosure so that evaporation takes place therewithin while condensation occurs outside said thermally insulated enclosure and within said first enclosure and heating means adapted initially to establish operative temperature conditions within the system and continuously to provide the additional heat necessary to replace any losses.

4. Apparatus for purifying a liquid by distillation in which the liquid to be purified is preheated in heat exchange with the products of condensation and evaporation, namely condensate and concentrate, comprising in combination: a peripheral heat exchanger including a circumscribing inlet passageway for the distilland and contiguous outlet passageway for the condensate and concentrate respectively, said outlet passageways being in counterflow heat exchange with said inlet passageway, an evaporator and a condenser adjacent thereto mounted within said heat exchanger so as to be thermally insulated by said heat exchanger from the environment of the apparatus, means for introducing distilland from said inlet passageway into said evaporator, means for introducing concentrate from said evaporator into one of said outlet passages, means for transferring vapor formed in said evaporator to said condenser, means for condensing vapor in said condenser, means for introducing condensate from said condenser into the other of said outlet passages, means for removing heat from said condenser and recovering said heat in said evaporator and heating means for initially establishing operative temperature conditions within the system and continuously providing the additional heat necessary to replace any losses.

5. Apparatus according to claim 4, wherein said means for recovering heat in said evaporator comprises a thermally conductive enclosure surrounding said evaporator and surrounded by and in contact with said condenser, and a compressor adapted to transfer vapor from within said enclosure to the surrounding condenser.

6. Apparatus according to claim 4, wherein said recovering heat comprises a thermally insulated enclosure surrounding said evaporator and surrounded by said condenser, and a heat pump including external energy source for transferring heat into said enclosure from the condenser surrounding said enclosure.

7. Apparatus according to claim 4 wherein said peripheral heat exchanger passageways comprise concentrically arrayed exchanger surfaces, whereby the temperature varies on any radial such that said temperature approaches that of said evaporator as distance from said evaporator decreases, and said temperature approaches that of said environment as distance from exterior of said apparatus decreases.

8. Apparatus according to claim 7, wherein said means for recovering heat comprises an endless passageway having a constricted portion near and thermally connected to said condenser and having an enlarged portion near and thermally, and directly connected to said evaporator, and means for impelling some of said vapor around said endless passage.

References Cited

UNITED STATES PATENTS

| | | | |
|---|---|---|---|
| 3,394,054 | 7/1968 | Hoham | 202—195 X |
| 2,389,789 | 11/1945 | Latham Jr. | 203—10 X |
| 2,793,988 | 5/1957 | Latham Jr. | 203—11 X |
| 3,026,256 | 3/1962 | Liljeblad et al. | 165—47 X |
| 3,088,890 | 5/1963 | Kratz | 204—154.2 |
| 3,251,397 | 5/1966 | Lens | 159—17 R |
| 3,311,543 | 3/1967 | Loebel | 202—236 X |
| 3,581,649 | 6/1971 | Ravenhorst | 165—66 |
| 3,595,759 | 7/1971 | Chambers | 203—11 |
| 3,607,663 | 9/1971 | Vandenberg | 203—11 |
| 1,045,915 | 12/1912 | Turner | 159—46 |

JACK SOFER, Primary Examiner

U.S. Cl. X.R.

202—185 R, 235, 236